May 21, 1935.   F. THEUERKAUF   2,001,989
APPARATUS AND METHOD OF TRANSPORTING LIVE FISHES
Filed Feb. 25, 1932
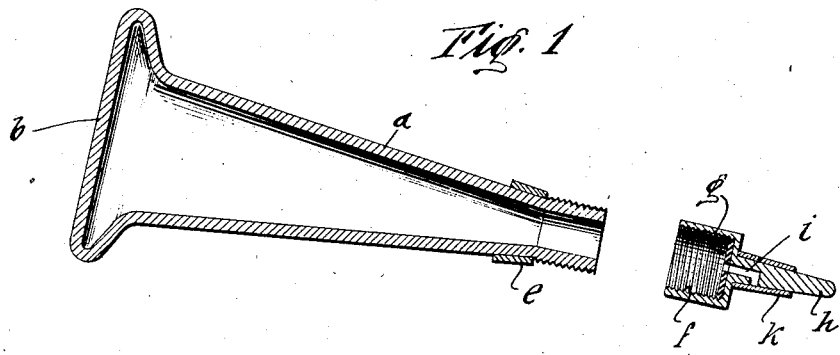
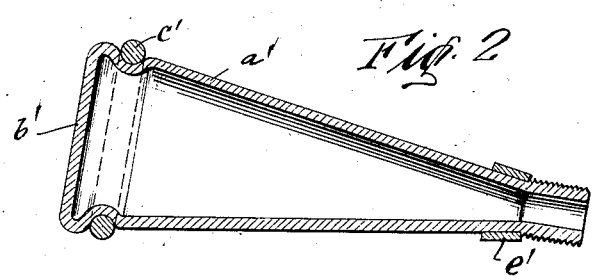
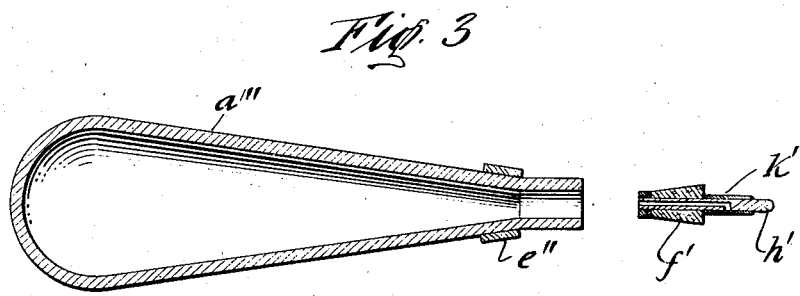
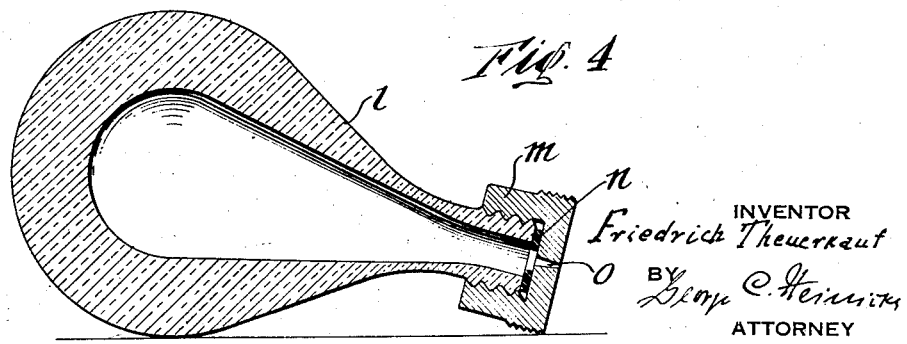
INVENTOR
Friedrich Theuerkauf
BY
ATTORNEY Patented May 21, 1935

2,001,989

UNITED STATES PATENT OFFICE 2,001,989

APPARATUS AND METHOD OF TRANSPORTING LIVE FISHES

Friedrich Theuerkauf, Nowawes/Potsdam, Germany

Application February 25, 1932, Serial No. 595,211
In Germany February 26, 1931

2 Claims. (Cl. 119—5)

In order to transport living fishes in reservoirs safely for considerable distances the reservoirs either will be occupied by a small number of fishes only or it will be necessary to add to the water of the said reservoirs oxygen under pressure from steel-flasks, which will be supplied to the reservoir through a valve provided with a distributor. For both of these arrangements the costs of transport are in proportion rather high.

It has been attempted to overcome this fault by replacing the oxygen under pressure by hydrogenperoxid. However, this proved to be a very slow process necessitating the employ of complicated apparatus which made the fish transport impracticable.

It is the object of my invention to simplify the transport of live fishes by proceeding as follows:

The fishes are to be weighed as usual and carefully brought into the reservoir for transport, filled with clear water. Then a catalyzator for hydrogenperoxid—suitably a vegetable or animal enzym, for instance in the form of an extract of liver—is brought into the reservoir. Hereupon a submersible vessel provided with a nozzle, and which is filled with watery hydrogenperoxid, will be charged with a catalyzator for hydrogenperoxid, for instance in the form of plated Steatite-pearls i. e. silver-plated soap-stone-pearls and placed in the reservoir for the fishes. The submersible-vessel is constructed in a manner that, when placed on the bottom of the reservoir the nozzle at the bottom will engage as much as possible the deepest part of the reservoir.

The catalyzator within the submersible-vessel is now decomposing slowly the hydrogenperoxid, forming oxygen, which will gradually drive the watery hydrogenperoxid from the submersible-vessel through the nozzle into the fish-reservoir, where it will be split at once into water and oxygen by the catalyzator first mentioned. The small bubbles of the oxygen-gas are—contrary to the bubbles of gas produced by introducing compressed oxygen from a steel-flask—of the smallest conceivable volume; the said bubbles therefore mount to the surface very slowly only and are therefore fully utilized.

It is evident that in proportion to the species and number of the fishes to be transported or to the duration of the transport more or less hydrogenperoxid forming oxygen may be introduced into the fish-reservoir within a certain period by the proper selection of the catalyzator or by applying a suitable quantity of catalyzator, In order to avoid displacement of the submersible-vessel or falling of the vessel out of the reservoir when emptying the reservoir the submersible-vessel may be fastened by a suitable mechanism. This mechanism has the advantage that as the submersible-vessel may set up at a steep inclination, the watery hydrogenperoxid will be driven out completely. Besides the submersible-vessel cannot rise.

In the accompanying drawing various forms of the submersible-vessel are represented as examples and Fig. 1 shows a vessel of a conical form.

Fig. 2 shows a vessel of a similar form with a supporting ring near the bottom.

Fig. 3 shows a vessel in the form of a pear.

Fig. 4 shows a modified form of submersible vessel.

As shown in Figure 1, a conical vessel $a$ for the reception of a hydrogen-peroxid solution and a catalyzator has a flanged end part $b$, the projecting flange of which sustains the vessel in its inclined position on its support at a suitable angle to the same. A weight or band $e$ guided about the vessel $a$ near its narrower end prevents the rising of the gradually emptying vessel in the water within the fish tank so that its nozzle will always remain close to the bottom of the fish transporting tank.

After the vessel $a$ has been filled with the watery hydrogen-peroxid and a catalyzator, the mouth thereof is closed by a screw cap $f$ in which a tightening ring $g$ is provided, and a nozzle $h$ formed with said cap has an outlet channel $i$ formed therein, which ordinarily is closed by an annular closure $k$ of suitable material which can however be removed before the vessel is placed into the transporting tank and the outlet channel $i$ will then allow a gradual discharge of the contents of vessel $a$ into the water of the tank during the transportation of the fishes.

The form of my invention illustrated in Figure 2 differs from that shown in Figure 1 only by the formation of the flanged end $b'$ at the end of the vessel $a'$ which acts to support the vessel in a suitable inclined position within the transporting tank and has an annular groove formed near its inner part in which a ring $c$ of suitable material is located for the protection of the vessel, while a weight or band $e'$ near the mouth of the vessel will keep the vessel submerged.

In the form of my invention illustrated in Figure 3, the vessel $a''$ for the reception of the hydrogenperoxid and catalyzator is substantially pear-shaped and a weight or band $e''$ is provided near the mouth of the vessel. A closing stopper $f'$ for the mouth of vessel $a''$ has a nozzle $h'$ formed therewith the opening of which is normally closed by an annular closure $k'$, of suitable material which however can be removed before the vessel is placed into the fish transporting tank to allow the escape of the contents of vessel $a''$ during the transportation of the fishes.

In the modified form of my immersible vessel illustrated in Figure 4, the walls of the pear-shaped vessel $l$ are formed of comparatively thick and heavy glass and its opening or mouth is closed by means of a screw-cap $m$ and washer $n$ provided with an outlet $o$.

The weight of the material of the vessel and its pear-shape will keep it in an inclined position in the fish transporting tank at or near the bottom thereof.

In use the annular closures $k$ or $k'$ which may be made of a suitable material such as for instance rubber, will be placed upon the nozzles $h$ or $h'$ for keeping the nozzle openings $i$ closed while the vessels containing the watery solution of hydrogenperoxid and the catalyzator is stored or transported. Before placing the vessels $a, a', a''$ or $l$ into the water containing tank for the transportation of the fishes the closures are removed to allow a gradual discharge of the contents of the vessels into the tank.

It will be clear that the end flanges will keep the vessels in the tank in a suitable inclined position to the bottom thereof, and that the weighted bands $e, e', e''$ will prevent a rising of the gradually emptying vessels, and that their nozzles will always be kept near the tank bottom.

I claim:

1. In devices for the transportation of live fishes in water and an enzym therein, an immersible vessel shaped to assume an inclined position and filled with watery hydrogenperoxid and a catalyzator, and a nozzle near one end of said vessel permitting the discharge of the watery hydrogenperoxid to form water and oxygen in small quantities to slowly charge the water therewith.

2. For the transportation of live fishes in water and enzym therein, a vessel to be immersed into the water to assume an inclined position therein and containing a solution of hydrogenperoxid and a catalyzator, and a nozzle through which the oxygen developed by the decomposition of the hydrogenperoxid in said vessel by the catalyzator drives a watery solution of hydrogenperoxid into the water to be split therein into oxygen and water, the former slowly rising in the form of minute bubbles for oxygenizing the water.

FRIEDRICH THEUERKAUF.